(12) United States Patent
Nakata

(10) Patent No.: US 11,929,834 B2
(45) Date of Patent: Mar. 12, 2024

(54) REDUNDANT COMMUNICATION APPARATUS, METHOD, AND PROGRAM

(71) Applicant: DENSO CORPORATION, Kariya (JP)

(72) Inventor: Tsuneo Nakata, Kariya (JP)

(73) Assignee: DENSO CORPORATION, Kariya (JP)

( * ) Notice: Subject to any disclaimer, the term of this patent is extended or adjusted under 35 U.S.C. 154(b) by 0 days.

(21) Appl. No.: 17/809,440

(22) Filed: Jun. 28, 2022

(65) Prior Publication Data

US 2023/0006905 A1   Jan. 5, 2023

(30) Foreign Application Priority Data

Jun. 30, 2021   (JP) .................................. 2021-108690

(51) Int. Cl.
*H04L 1/1812* (2023.01)
*H04L 41/147* (2022.01)
*H04L 43/0823* (2022.01)
*H04L 43/0852* (2022.01)

(52) U.S. Cl.
CPC .......... *H04L 1/1819* (2013.01); *H04L 41/147* (2013.01); *H04L 43/0847* (2013.01); *H04L 43/0852* (2013.01)

(58) Field of Classification Search
CPC . H04L 1/1819; H04L 41/147; H04L 43/0829; H04L 43/0847; H04L 43/0852
See application file for complete search history.

(56) References Cited

U.S. PATENT DOCUMENTS

| | | | |
|---|---|---|---|
| 10,652,782 B1 * | 5/2020 | Korpi | G06N 3/042 |
| 2007/0079222 A1 * | 4/2007 | Kure | H04L 1/1816 714/776 |
| 2009/0175191 A1 * | 7/2009 | Lin | H04L 43/0894 370/253 |
| 2015/0095739 A1 | 4/2015 | Zhovnirnovsky et al. | |
| 2015/0100858 A1 | 4/2015 | Zhovnirovsky et al. | |

OTHER PUBLICATIONS

Lin et al. An Enhanced Adaptive FEC Mechanism for Video Delivery over Wireless Networks. 2006 IEEE. (Year: 2006).*

* cited by examiner

*Primary Examiner* — Bryan Y Lee
(74) *Attorney, Agent, or Firm* — MASCHOFF BRENNAN

(57) ABSTRACT

A redundant communication apparatus includes a determining unit and a transmitting unit. The determining unit determines an upper limit of a redundancy level when transmission waiting data in a transmission apparatus is made redundant and transmitted, based on a data quantity of the transmission waiting data and a communication speed of a communication line between a reception apparatus that is a transmission destination of the transmission waiting data and the transmission apparatus. The transmitting unit causes the transmission waiting data to be made redundant at a redundancy level that is equal to or less than the upper limit determined by the determining unit and transmits the data to the reception apparatus via the communication line.

12 Claims, 8 Drawing Sheets

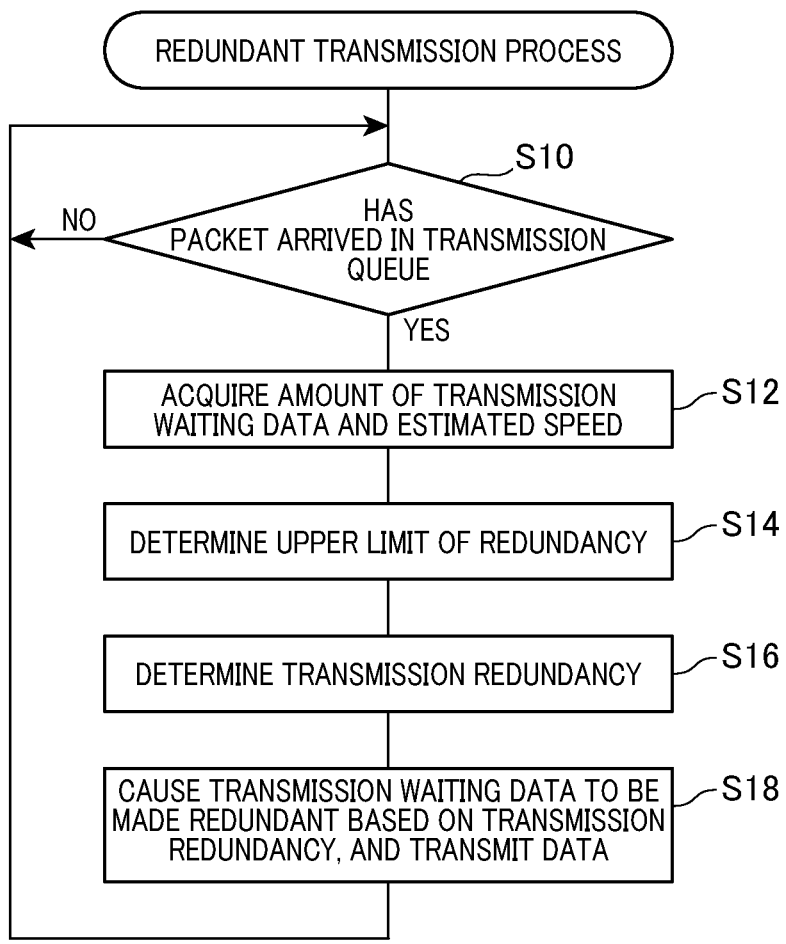

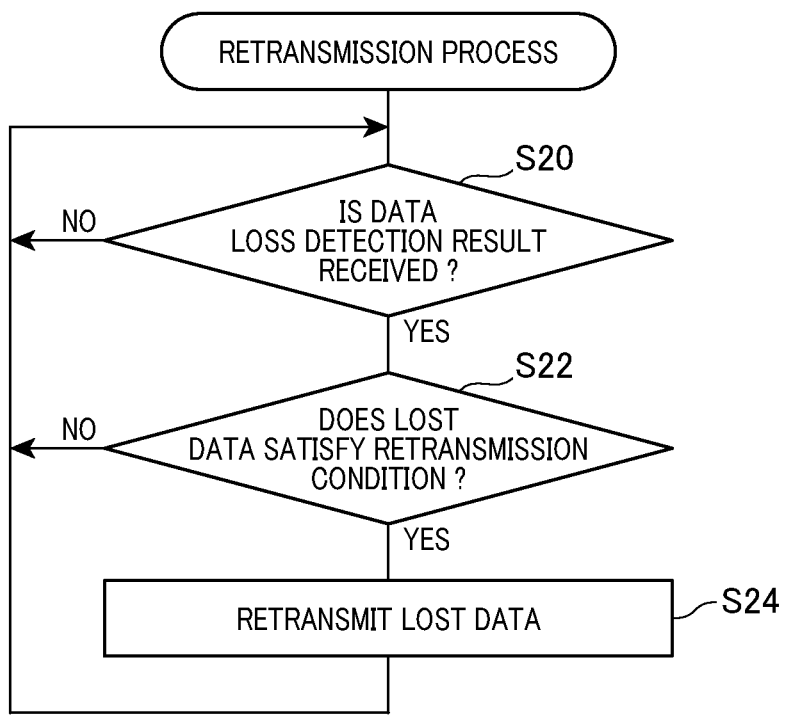

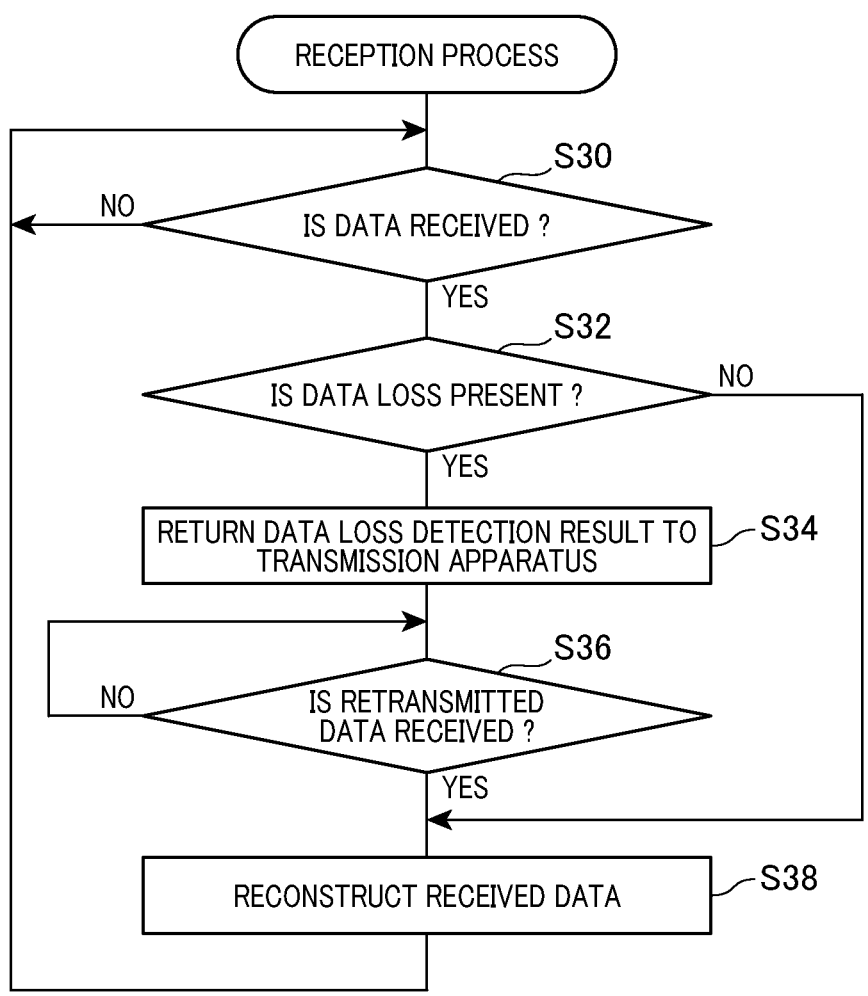

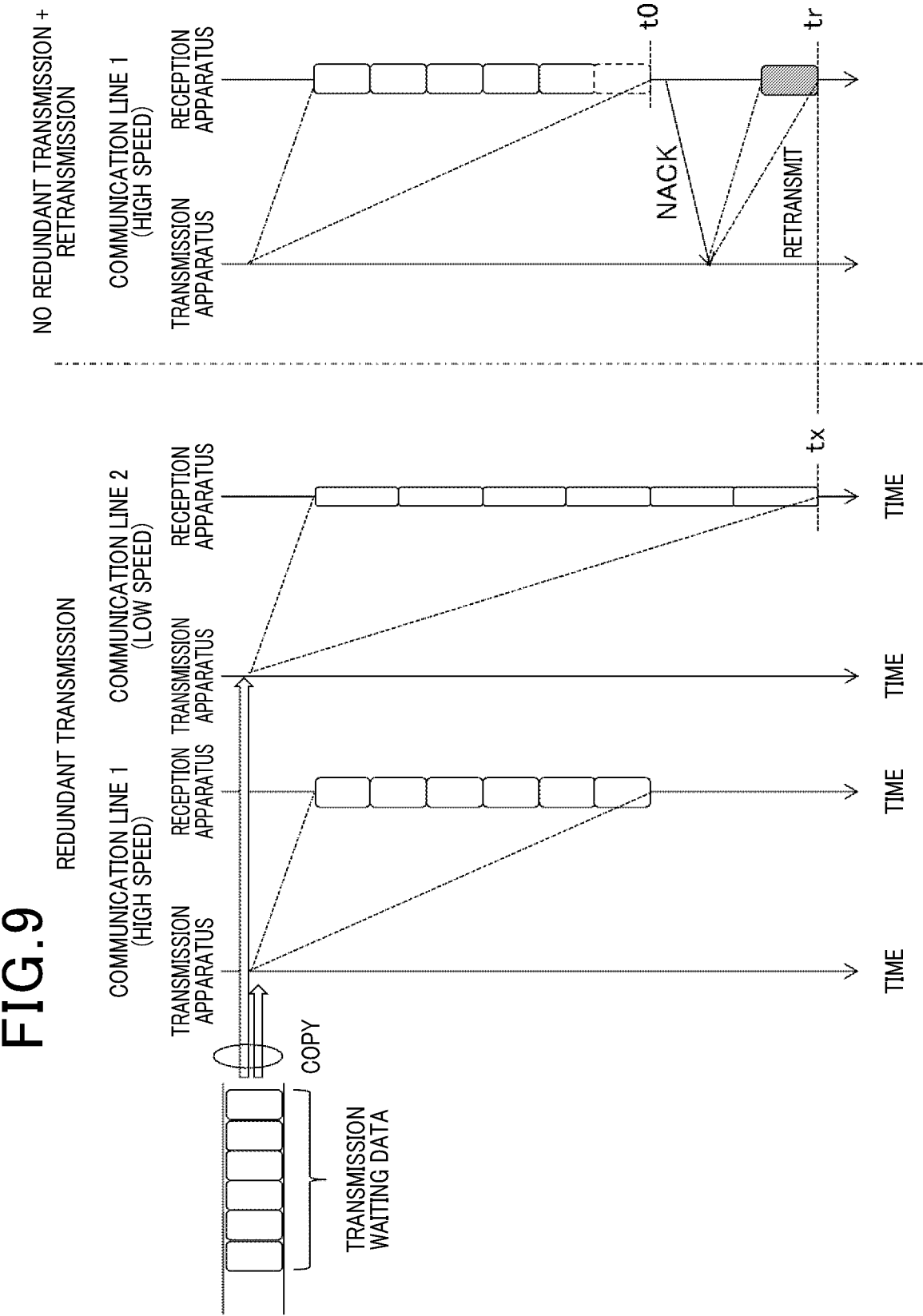

REDUNDANT COMMUNICATION APPARATUS, METHOD, AND PROGRAM

CROSS-REFERENCE TO RELATED APPLICATIONS

This application is based on and claims the benefit of priority from Japanese Patent Application No. 2021-108690, filed on Jun. 30, 2021. The entire disclosure of the above application is incorporated herein by reference.

BACKGROUND

Technical Field

The present disclosure relates to a redundant communication apparatus, a redundant communication method, and a redundant communication program.

Related Art

Technologies for restoring or preventing data loss between a transmission apparatus and a reception apparatus have been known. For example, the following packet transmission apparatus has been proposed. This packet transmission apparatus controls retransmission of undelivered packets, adds a redundant packet to a data packet block, receives network state information, and dynamically determines a redundancy level based on the received network state information to prevent retransmission of undelivered packets after error correction in a receiver.

SUMMARY

One aspect of the present disclosure provides a redundant communication apparatus that determines an upper limit of a redundancy level when transmission waiting data in a transmission apparatus is made redundant and transmitted, based on a data quantity of the transmission waiting data and a communication speed of a communication line between a reception apparatus that is a transmission destination of the transmission waiting data and the transmission apparatus. The redundant communication apparatus causes the transmission waiting data to be made redundant at a redundancy level that is equal to or less than the upper limit determined by the determining unit, and transmits the data to the reception apparatus via the communication line.

BRIEF DESCRIPTION OF THE DRAWINGS

In the accompanying drawings:

FIG. 6 is a flowchart illustrating an example of a redundant transmission process;

FIG. 7 is a flowchart illustrating an example of a retransmission process;

FIG. 8 is a flowchart illustrating an example of a reception process; and

FIG. 9 is a diagram for explaining redundant transmission according to a second embodiment.

DESCRIPTION OF THE EMBODIMENTS

Figure 1:
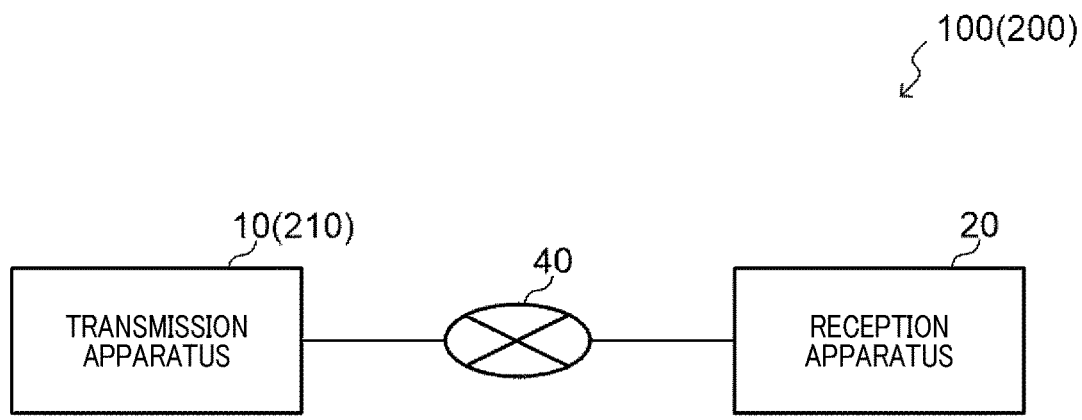
FIG. 1 is a block diagram illustrating an overall configuration of a redundant communication system.

Conventionally, there are technologies for restoring or preventing data loss between a transmission apparatus and a reception apparatus. For example, a packet transmission apparatus that includes an automatic packet retransmitting unit, an erasure coding unit, and a redundancy level determining unit has been proposed. The automatic packet retransmitting unit is configured to control retransmission of undelivered packets. The erasure coding unit is configured to add a redundant packet to a data packet block. In this packet transmission apparatus, the redundancy level determining unit receives network state information and dynamically determines an amount of the redundancy level based on the received network state information to prevent retransmission of undelivered packets after error correction in a receiver (refer to JP-A-2016-502794).

In the technology described in JP-A-2016-502794, forward error correction is performed at a redundancy level that is based on a packet loss rate that is estimated from the network state information. Therefore, an issue arises in that, as the packet loss rate increases, an amount of data for redundancy increases and an amount of time required until completion of data transmission increases.

It is thus desired to suppress delay that occurs as a result of data being made redundant and transmitted.

A first exemplary embodiment of the present disclosure provides a redundant communication apparatus that includes: a determining unit that determines an upper limit of a redundancy level when transmission waiting data in a transmission apparatus is made redundant and transmitted, based on a data quantity of the transmission waiting data and a communication speed of a communication line between a reception apparatus that is a transmission destination of the transmission waiting data and the transmission apparatus; and a transmitting unit that causes the transmission waiting data to be made redundant at a redundancy level that is equal to or less than the upper limit determined by the determining unit and transmits the data to the reception apparatus via the communication line.

A second exemplary embodiment of the present disclosure provides a redundant communication method that includes: determining, by a determining unit, an upper limit of a redundancy level when transmission waiting data in a transmission apparatus is made redundant and transmitted, based on a data quantity of the transmission waiting data and a communication speed of a communication line between a reception apparatus that is a transmission destination of the transmission waiting data and the transmission apparatus; and causing, by a transmitting unit, the transmission waiting data to be made redundant at a redundancy level that is equal to or less than the upper limit determined by the determining unit and transmitting the data to the reception apparatus via the communication line.

A third exemplary embodiment of the present disclosure provides a non-transitory computer-readable storage medium storing therein a redundant communication program for causing a computer to implement: determining an upper limit of a redundancy level when transmission waiting data in a transmission apparatus is made redundant and transmitted, based on a data quantity of the transmission waiting data and a communication speed of a communication line between a reception apparatus that is a transmission destination of the transmission waiting data and the transmission apparatus; and causing the transmission waiting data to be made redundant at a redundancy level that is equal to or less than the upper limit determined by the determining unit, and transmitting the data to the reception apparatus via the communication line.

As a result of the redundant communication apparatus, method, and program of the present disclosure, delay that occurs as a result of data being made redundant and transmitted can be suppressed.

Embodiments will hereinafter be described with reference to the drawings.

First Embodiment

As shown in FIG. 1, a redundant communication system 100 according to a first embodiment includes a transmission apparatus 10 and a reception apparatus 20. The transmission apparatus 10 and the reception apparatus 20 are connected by a communication line 40, and transmit and receive data therebetween. Here, the number of transmission apparatuses 10 and the number of reception apparatuses 20 that are included in the redundant communication system 100 are not limited to those in the example in FIG. 1. Two or more of each of the transmission apparatus 10 and the reception apparatus 20 may be included.

Figure 2:
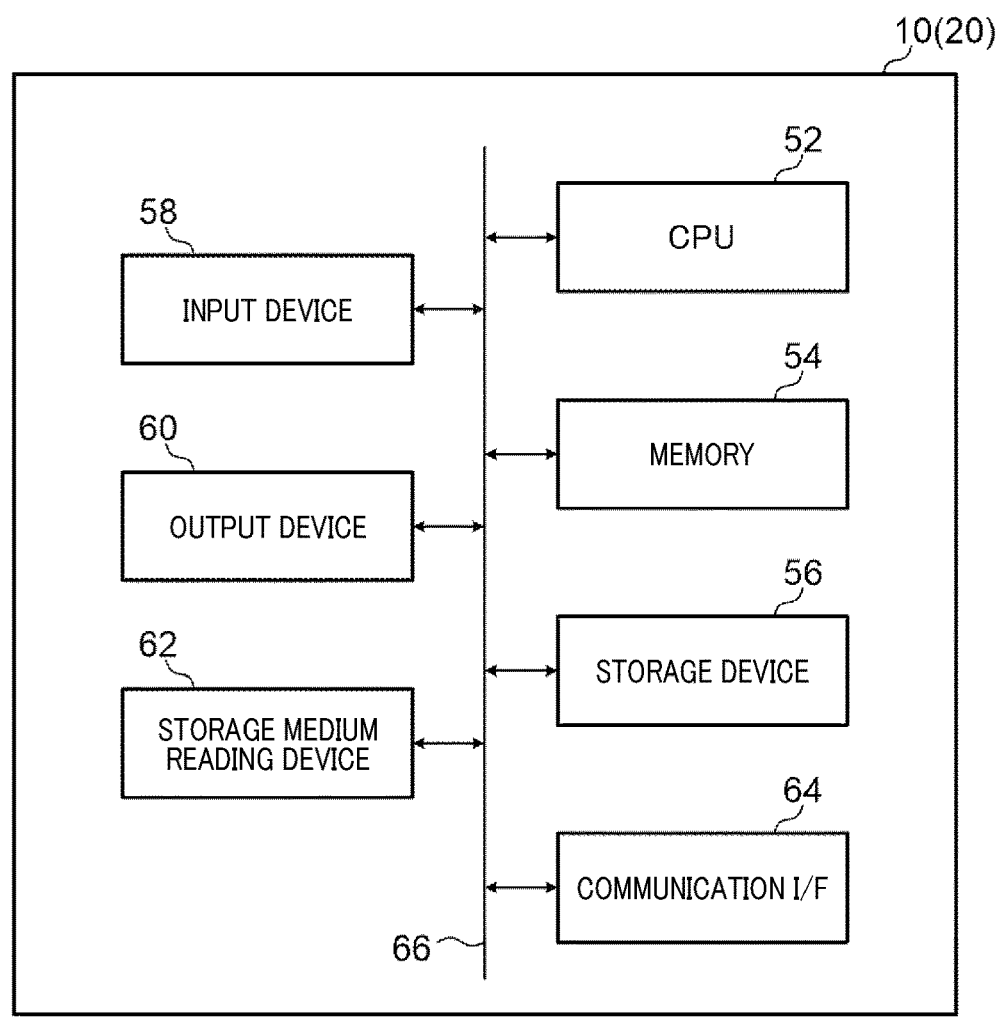
FIG. 2 is a block diagram illustrating a hardware configuration of a transmission apparatus (reception apparatus)

FIG. 2 shows a hardware configuration of the transmission apparatus 10. As shown in FIG. 2, the transmission apparatus 10 includes a central processing unit (CPU) 52, a memory 54, a storage device 56, an input device 58, an output device 60, a storage medium reading device 63, and a communication interface (I/F) 64. The configurations are communicably connected to one another by a bus 66.

The storage device 56 stores therein a redundant communication program for performing a redundant transmission process and a retransmission process described hereafter. The CPU 52 is a central processing unit that runs various programs and controls each configuration. That is, the CPU 52 reads a program from the storage device 56 and runs the program using the memory 54 as a work area. The CPU 52 performs control of the above-described configurations and various types of calculation processes based on the program that is stored in the storage device 56.

The memory 54 is configured by a random access memory (RAM) and temporarily stores therein programs and data as a work area. The storage device 56 is configured by a read-only memory (ROM), a hard disk drive (HDD), a solid-state drive (SSD), or the like, and stores therein various programs including an operating system and various types of data.

For example, the input device 58 may be an apparatus for performing various types of input, such as a keyboard or a mouse. For example, the output device 60 may be an apparatus for outputting various types of information, such as a display or a printer. Through use of a touch panel display as the output device 60, the output device 60 can also function as the input device 58.

The storage medium reading device 62 performs reading of data that is stored in various types of storage media, such as a compact disc (CD)-ROM, a digital versatile disc (DVD)-ROM, a Blu-ray disc, and a Universal Serial Bus (USB) memory, writing of data in the storage media, and the like. The communication I/F 64 is an interface for communicating with other apparatuses including the reception apparatus 20. For example, a standard such as Ethernet (registered trademark), Fiber Distributed Data Interface (FDDI), or Wi-Fi (registered trademark) may be used.

A hardware configuration of the reception apparatus 20 is substantially similar to the hardware configuration of the transmission apparatus 10 shown in FIG. 2. Therefore, a description thereof is omitted. Here, a redundant communication program for performing a reception process described hereafter is stored in the storage device 56 of the reception apparatus 20.

Figure 3:
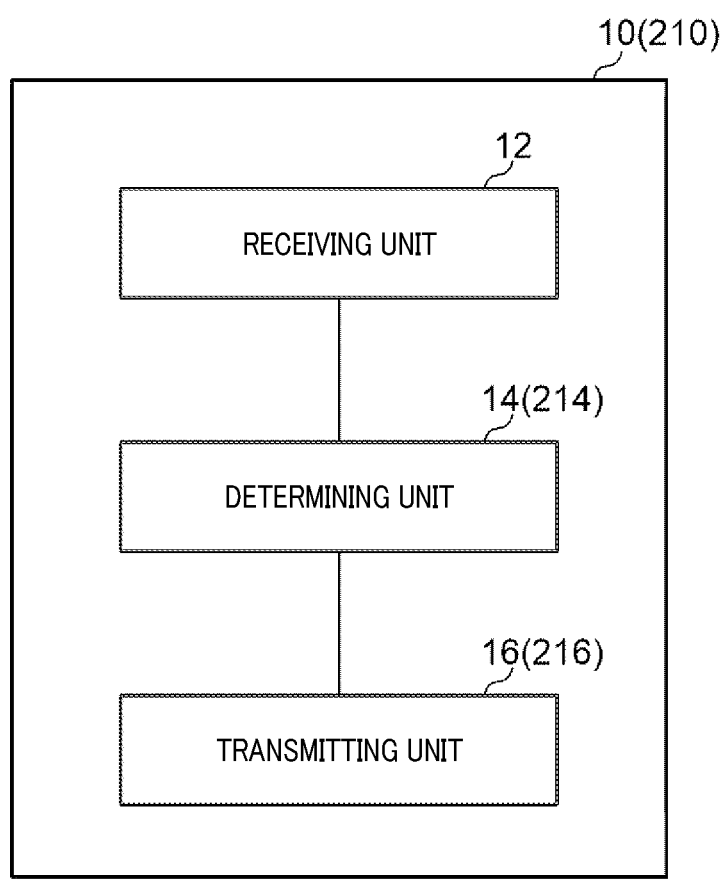
FIG. 3 is a functional block diagram illustrating the transmission apparatus.

Next, with reference to FIG. 3, a functional configuration of the transmission apparatus 10 according to the first embodiment will be described. As shown in FIG. 3, the transmission apparatus 10 includes a receiving unit 12, a determining unit 14, and a transmitting unit 16. Each functional unit is implemented by the CPU 52 shown in FIG. 2.

The receiving unit 12 receives a data loss detection result (details described hereafter) from the reception apparatus 20. The receiving unit 12 notifies the transmitting unit 16 of the received data loss detection result.

The determining unit 14 determines an upper limit of a redundancy level when data that is awaiting transmission is made redundant and transmitted. The determining unit 14 determines the upper limit of the redundancy level based on a data quantity of the transmission waiting data in the transmission apparatus 10, and a communication speed of the communication line 40 between the reception apparatus 20 that is a transmission destination of the transmission waiting data and the transmission apparatus 10. Hereafter, data being made redundant and transmitted is also referred to as "redundant transmission."

Specifically, the determining unit 14 determines the upper limit of the redundancy level such that a delay in a predicted time of completion of transmission (predicted transmission-completion time) to the reception apparatus 20 when redundant transmission is performed, in relation to a predicted time of completion of transmission to the reception apparatus 20 when redundant transmission is not performed, is equal to or less than a predetermined value. The predetermined value may be a fixed value that is based on an application related to the data to be transmitted, or a predicted value of a delay that occurs as a result of data that is lost during transmission being retransmitted.

Figure 4:
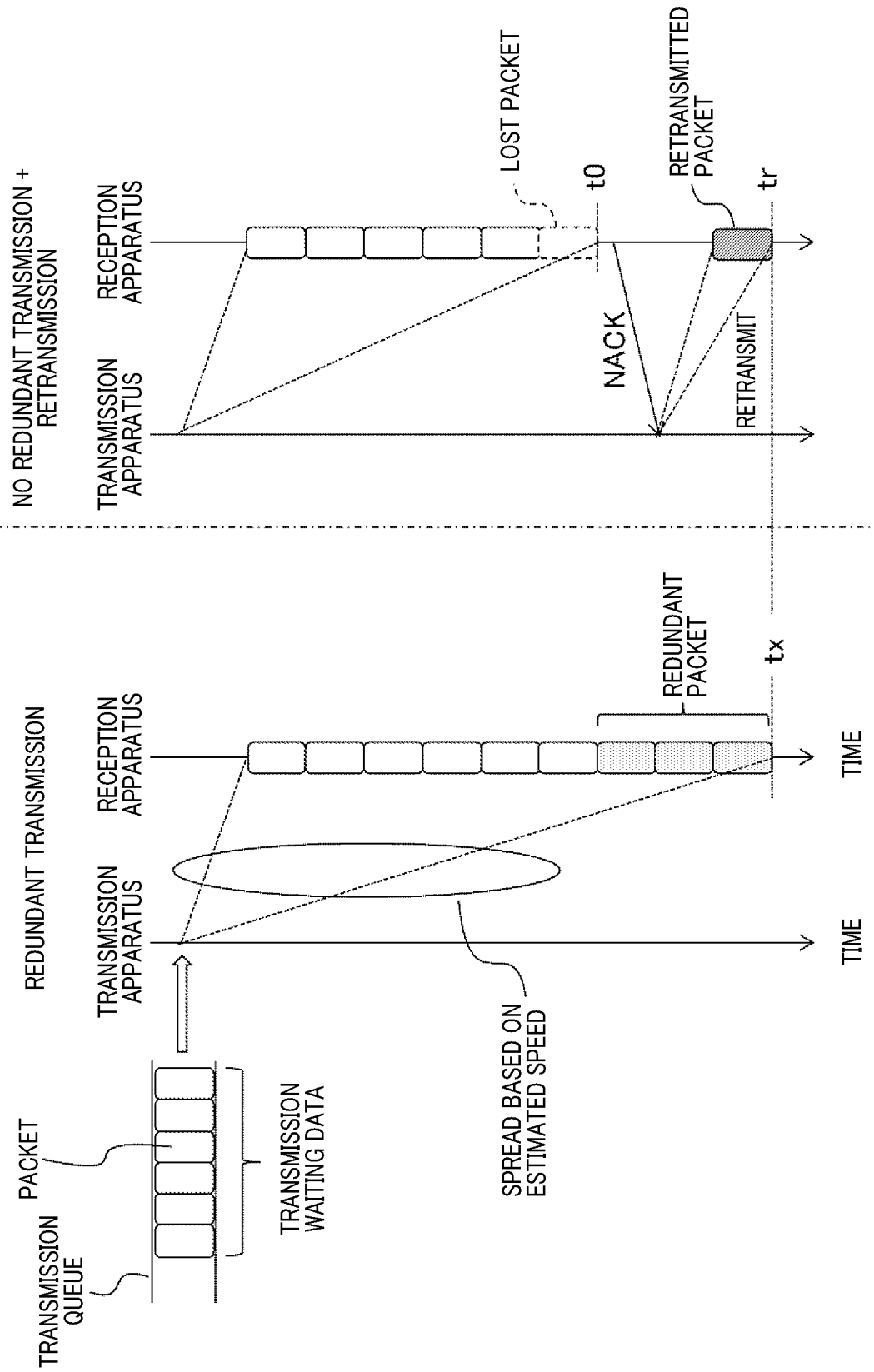
FIG. 4 is a diagram for explaining redundant transmission according to a first embodiment.

Details will be described with reference to FIG. 4. An example in FIG. 4 is a case in which the predetermined value is the predicted value of the delay that occurs as a result of data that is lost during transmission being retransmitted. In addition, in FIG. 4, a single packet is indicated by a single block. Furthermore, in FIG. 4, a time axis that indicates a transmission time in the transmission apparatus 10 and a time axis that indicates a reception time in the reception apparatus 20 are shown in correspondence. Moreover, in FIG. 4, a reception timing of each packet in the reception apparatus 20 is indicated by the block that indicates the packet being associated with the time axis that indicates the reception time. This also similarly applies to FIG. 9 described hereafter.

The transmission waiting data is stored in a transmission queue of the transmission apparatus 10 in packets. The determining unit 14 acquires the data quantity of the transmission waiting data that is stored in the transmission queue. In addition, the determining unit 14 acquires the communication speed of the communication line 40. As the communication speed, an available bandwidth that indicates an amount of data that can be transferred per unit time that is estimated by a conventionally known method (also referred to, hereafter, as an "estimated speed") may be used. For example, the determining unit 14 may acquire the estimated speed that is estimated by the reception apparatus 20 from the reception apparatus 20. The determining unit 14 predicts a predicted transmission-completion time t0 when redundant transmission is not performed, based on the acquired data quantity and estimated speed. In addition, the determining unit 14 predicts a predicted retransmission-completion time tr when a portion of data is lost and the lost portion is retransmitted. An example of the above-described predetermined value is tr−t0.

FIG. 4 shows an example in which a final packet of the data that is transmitted is lost. In the example, the reception apparatus 20 issues a retransmission request ("NACK" in FIG. 4) for the packet that is lost (referred to hereafter as a "lost packet"), and the transmission apparatus 10 retransmits the lost packet in response to the retransmission request. In this case, the determining unit 14 predicts the predicted retransmission-completion time tr by adding, to the predicted transmission-completion time t0, an amount of time that is prescribed in advance as an amount of time from when the reception apparatus 20 detects the lost packet until the transmission apparatus 10 receives the retransmission request and an amount of time that is required for data retransmission. Here, the determining unit 14 predicts the amount of time that is required for data retransmission from the data quantity of the lost packet and the estimated speed.

A case in which redundant transmission is performed by redundant data that is composed of an error correction code being added to the transmission waiting data is considered. The determining unit 14 sets a predicted transmission-completion time tx when redundant transmission is performed to a time that is predicted based on a total data quantity that is obtained by the redundant data when the redundancy level is x being added to the transmission waiting data, and the estimated speed. The determining unit 14 determines, as the upper limit of the redundancy level, x that is such that the predicted transmission-completion time tx when redundant transmission is performed is equal to the predicted retransmission-completion time tr. That is, the determining unit 14 determines the upper limit of the redundancy level such that an upper limit of a data quantity of a redundant packet is a data quantity that can be transmitted within time (tr−t0) that is indicated by the predetermined value.

More specifically, the determining unit 14 calculates a data quantity D2 that can be transmitted within the time (tr−t0) that is indicated by the predetermined value by $D2=V\times(tr-t0)$. V is the estimated speed. Then, the determining unit 14 calculates the upper limit x of the redundancy level by $x=(D1+D2)/D1$. D1 is the data quantity of the transmission waiting data. In the example in FIG. 4, a case in which the number of redundant packets is three for transmission waiting data in the transmission queue being six packets of a same size is the upper limit at which tx does not exceed tr. In this case, x is calculated as $x=(6+3)/6=1.5$. The determining unit 14 notifies the transmitting unit 16 of the determined upper limit of the redundancy level.

The transmitting unit 16 determines a redundancy level that is equal to or less than the upper limit notified by the determining unit 14 as a transmission redundancy level. The transmitting unit 16 causes the transmission waiting data to be made redundant at the transmission redundancy level, and transmits the data to the reception apparatus 20 via the communication line 40. Here, when a predetermined redundancy level is set and the upper limit of the redundancy level that is determined by the determining unit 14 falls below the predetermined redundancy level, the transmitting unit 16 may determine the predetermined redundancy level to be the transmission redundancy level. For example, the predetermined redundancy level may be a redundancy level that is initially set, or a redundancy level that is designated in control information or the like that is added to the data.

In addition, when the transmitting unit 16 is notified of the data loss detection result from the receiving unit 12, the transmitting unit 16 determines whether the lost data that is indicated by the data loss detection result satisfies a retransmission condition. For example, the retransmission condition may be that a confirmation of delivery (such as ACK) of transmitted data (in this case, the redundant packet) that is necessary for loss compensation of the lost data is not received from the reception apparatus 20. Alternatively, for example, the retransmission condition may be that the transmission redundancy level at a time of transmission of the lost data does not exceed the predetermined redundancy level. When the retransmission condition is satisfied, the transmitting unit 16 retransmits the lost data.

Figure 5:
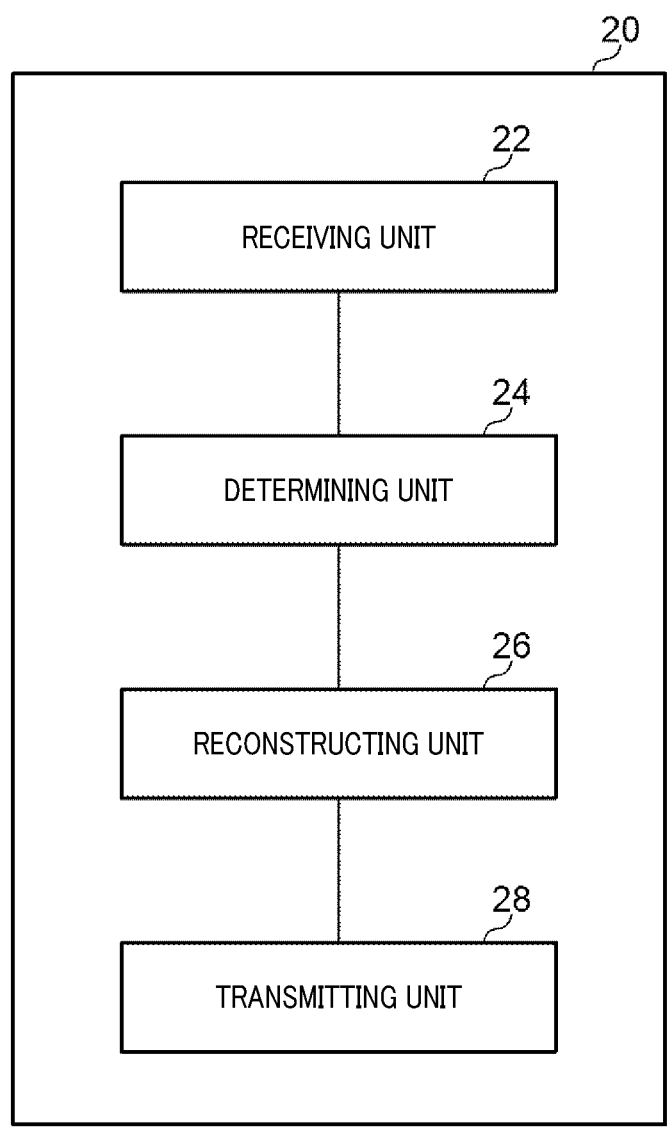
FIG. 5 is a functional block diagram illustrating the reception apparatus.

Next, a functional configuration of the reception apparatus 20 according to the first embodiment will be described with reference to FIG. 5. As shown in FIG. 5, the reception apparatus 20 includes a receiving unit 22, a detecting unit 24, a reconstructing unit 26, and a transmitting unit 28. Each functional unit is implemented by the CPU 52 shown in FIG. 2.

The receiving unit 22 receives data that is transmitted from the transmission apparatus 10 via the communication line 40. The data that is received by the receiving unit 22 includes data to be transmitted, redundant data, and data that is a retransmission of lost data (also referred to, hereafter, as "retransmitted data"). The receiving unit 22 transfers the received data to the detecting unit 24 and the reconstructing unit 26.

The detecting unit 24 detects whether data loss is present in the data to be transmitted that has been transferred from the receiving unit 22. For example, when a missing sequence number is present among sequence numbers that are respectively included in the received packets, the detecting unit 24 may determine that a packet that corresponds to the missing sequence number is lost. The detecting unit 24 transfers, to the transmitting unit 28, a data loss detection result that includes presence/absence of data loss and information that identifies the lost data when data is lost.

The reconstructing unit 26 reconstructs the data that has been transferred from the receiving unit 22. Specifically, when the received packets arrive out of order, the reconstructing unit 26 rearranges the packets in order based on the sequence numbers that are added to the packets. In addition, when lost data is present, the reconstructing unit 26 performs error correction based on the redundant data and compensates for loss due to lost data. Furthermore, when retransmitted data that corresponds to a lost packet is received, the reconstructing unit 26 reconstructs the lost portion using the retransmitted data. The reconstructing unit 26 transfers the reconstructed data to an application of a poststage or the like.

The transmitting unit 28 transmits, to the transmission apparatus 10, the data loss detection result that has been transferred from the detecting unit 24.

Next, workings of the redundant communication system 100 according to the first embodiment will be described. In the transmission apparatus 10, the redundant transmission process shown in FIG. 6 and the retransmission process shown in FIG. 7 are performed. In addition, in the reception apparatus 20, the reception process shown in FIG. 8 is performed. Here, the redundant transmission process is an example of a redundant communication method of the present disclosure.

First, the redundant transmission process will be described with reference to FIG. 6.

At step S10, the determining unit 14 determines whether a packet has arrived in the transmission queue of the transmission apparatus 10. When determined that a packet has not arrived, the determining unit 14 repeats the determination at the present step. When determined that a packet has arrived, the determining unit 14 proceeds to step S12. At step S12, the determining unit 14 acquires the data quantity of the transmission waiting data that is stored in the transmission queue and the estimated speed of the communication line 40.

Next, at step S14, the determining unit 14 determines the upper limit of the redundancy level such that the delay in the predicted time of completion of transmission to the reception apparatus 20 when redundant transmission is performed, in relation to the predicted time of completion of transmission to the reception apparatus 20 when redundant transmission is not performed, is equal to or less than the predetermined value. Next, at step S16, the transmitting unit 16 determines a redundancy level that is equal to or less than the upper limit determined at above-described step S14 as the transmission redundancy level. Next, at step S18, the transmitting unit 16 causes the transmission waiting data to be made redundant at the determined transmission redundancy level, transmits the data to the reception apparatus 20 via the communication line 40, and returns to step S10.

Next, the retransmission process will be described with reference to FIG. 7.

At step S20, the receiving unit 12 determines whether a data loss detection result that is transmitted from the reception apparatus 20 is received. When determined that a data loss detection result is not received, the receiving unit 12 repeats the determination at the present step. When determined that a data loss detection result is received, the receiving unit 12 proceeds to step S22.

At step S22, the transmitting unit 16 determines whether the lost data that is indicated by the data loss detection result satisfies the retransmission condition. When determined that the retransmission condition is satisfied, the transmitting unit 16 proceeds to step S24. When determined that the retransmission condition is not satisfied, the transmitting unit 16 returns to step S20. At step S24, the transmitting unit 16 retransmits the lost data to the reception apparatus 20 and returns to step S20.

Next, the reception process will be described with reference to FIG. 8.

At step S30, the receiving unit 22 determines whether data transmitted from the transmission apparatus 10 is received. When determined that data is received, the receiving unit 22 proceeds to step S32. When determined that data is not received, the receiving unit 22 repeats the determination at the present step. At step S32, the detecting unit 24 detects whether data loss is present in the data received at step S30. When data loss is detected, the detecting unit 24 proceeds to step S34. When data loss is not detected, the detecting unit 24 proceeds to step S38. At step S34, the transmitting unit 28 returns, to the transmission apparatus 10, a data loss detection result that includes the presence/absence of data loss detected by the detecting unit 24 and the information that identifies the lost data when data is lost.

Next, at step S36, the receiving unit 2 determines whether retransmitted data that is transmitted from the transmission apparatus 10 is received in response to a retransmission request that is based on the data loss detection result. When determined that retransmitted data is received, the receiving unit 22 proceeds to step S38. When determined that retransmitted data is not received, the receiving unit 22 repeats the determination at the present step. Here, the receiving unit 22 may proceed to step S38 when retransmitted data is not received even after elapse of a predetermined amount of time. At step S38, the reconstructing unit 26 performs rearrangement of the received data and compensation for lost data using redundant data or retransmitted data, reconstructs the received data, and returns to step S30.

As described above, in a redundant communication system according to the first embodiment, a transmission apparatus determines an upper limit of a redundancy level when redundant transmission is performed, based on a data quantity of transmission waiting data and a communication speed of a communication line between a reception apparatus that is a transmission destination of the transmission waiting data and the transmission apparatus. Then, the transmission apparatus causes the transmission waiting data to be made redundant at a redundancy level that is equal to or less than the determined upper limit, and transmits the data to the reception apparatus via the communication line. As a result, delay that occurs as a result of data being made redundant and transmitted can be suppressed.

In addition, in the redundant communication system according to the first embodiment, the transmission apparatus determines the upper limit of the redundancy level such that a delay in a predicted transmission-completion time when redundant transmission is performed, in relation to a predicted transmission-completion time when redundant transmission is not performed, is equal to or less than a predetermined value. Furthermore, the predetermined value at this time is a predicted value of a delay that occurs as a result of data that is lost during transmission being retransmitted.

In this case, when required redundancy cannot be achieved within the determined upper limit of the redundancy level, a method for retransmitting lost data (automatic repeat request [ARQ]) may be used in tandem. That is, redundant transmission may be performed only under a condition in which an effect of shortening delay by redundancy can be expected when a predetermined data arrival rate is presumed to be achieved on a communication line on which data loss occurs. As a result, delay can be minimized while reliability of data transmission is ensured.

Second Embodiment

Next, a second embodiment will be described. Here, in a redundant communication system according to the second embodiment, sections that are similar to those of the redundant communication system 100 according to the first embodiment are given the same reference numbers. Detailed descriptions thereof are omitted. In addition, regarding functional units according to the first embodiment and the second embodiment of which the reference numbers share the same last two digits, detailed descriptions of shared functions are omitted. Furthermore, hardware configurations of a transmission apparatus and a reception apparatus according to the second embodiment are similar to the hardware configurations of the transmission apparatus 10 and the reception apparatus 20 according to the first embodiment shown in FIG. 2. Therefore, descriptions thereof are omitted.

As shown in FIG. 1, a redundant communication system 200 according to the second embodiment includes a transmission apparatus 210 and the reception apparatus 20.

Next, with reference to FIG. 3, a functional configuration of the transmission apparatus 210 according to the second embodiment will be described. As shown in FIG. 3, the transmission apparatus 210 includes the receiving unit 12, a determining unit 214, and a transmitting unit 216. Each functional unit is implemented by the CPU 52 shown in FIG. 2.

According to the second embodiment, a case in which redundant transmission is performed by the transmission waiting data being copied and transmitted via each of a plurality of communication lines 40 of which the communication speeds differ is considered.

The determining unit 214 sets the predicted transmission-completion time when redundant transmission is not performed as a predicted transmission-completion time when the transmission waiting data is transmitted via a communication line 40 that has the fastest communication speed among the plurality of communication lines 40. In addition, the determining unit 214 sets the predicted transmission-completion time when redundant transmission is performed as a predicted transmission-completion time when the transmission waiting data is transmitted via each of the other communication lines 40. Then, the determining unit 214 determines the number of communication lines 40, among the plurality of communication lines 40, of which the delay in the predicted transmission-completion time when redundant transmission is performed, in relation to the predicted transmission-completion time when redundant transmission is not performed, is equal to or less than the predetermined value as the upper limit of the redundancy level.

This will be described in detail with reference to FIG. 9. In an example in FIG. 9, to simplify the description, a case in which copied data is redundantly transmitted using a relatively high-speed communication line 1 and a relatively low-speed communication line 2 will be described.

In a manner similar to the determining unit 14 according to the first embodiment, the determining unit 214 predicts the predicted transmission-completion time t0 and the predicted retransmission-completion time tr when redundant transmission is not performed based on the data quantity of the transmission waiting data and the estimated speed of the communication line 1 (high speed). In addition, the determining unit 214 predicts the predicted transmission-completion time tx when redundant transmission is performed based on the data quantity of the transmission waiting data and the estimated speed of the communication line 2 (low speed). Then, when the predicted transmission-completion time tx does not exceed the predicted retransmission-completion time tr, the determining unit 214 determines that redundant transmission via the communication line 2 is possible.

FIG. 9 shows a state in which the predicted transmission-completion time tx and the predicted retransmission-completion time tr are substantially equal, that is, a delay that is attributed to a difference in speed between the communication line 1 and the communication line 2 and a delay that is caused by retransmission are balanced. In this case, because the number of communication lines 40 via which the transmission waiting data is transmitted is two, the determining unit 214 determines the upper limit x of the redundancy level to be x=2. Here, when the number of communication lines is 2, x=1 indicates prohibition of redundant transmission (copy).

Here, N communication lines of which the speed increases in order of the communication line 1, communication line 2, . . . communication line N are present, and tx of a communication line n is maximum within a range in which tr is not exceeded. That is, tx of a communication line n+1 exceeds tr. In this case, the determining unit 214 determines the upper limit x of the redundancy level to be x=n.

The transmitting unit 216 determines a redundancy level that is equal to or less than the upper limit determined by the determining unit 214 as the transmission redundancy level. Then, the transmitting unit 216 copies the transmission waiting data so as to be the number indicated by the transmission redundancy level, and transmits the copied data via the communication lines 40 of which tx<tr.

Next, workings of the redundant communication system 200 according to the second embodiment will be described. According to the second embodiment, because only the redundant transmission process performed by the transmission apparatus 210 differs from the redundant transmission process (FIG. 6) according to the first embodiment, this difference will be described below.

According to the second embodiment, at step S14, the determining unit 214 sets a case in which the transmission waiting data is transmitted via the communication line 40 that has the fastest communication speed among the plurality of communication lines 40 as a case in which redundant transmission is not performed, and a case in which the transmission waiting data is transmitted via each of the other communication lines 40 as a case in which redundant transmission is performed. The determining unit 214 predicts the predicted transmission-completion time for each communication line 40, and determines the number of communication lines 40 of which the delay in the predicted transmission-completion time when redundant transmission is performed, in relation to the predicted transmission-completion time when redundant transmission is not performed, is equal to or less than the predetermined value as the upper limit of the redundancy level.

In addition, at step S16, the transmitting unit 216 determines a redundancy level that is equal to or less than the upper limit determined at step S14 as the transmission redundancy level. Next, at step S18, the transmitting unit 216 copies the transmission waiting data so as to be the number indicated by the transmission redundancy level, and transmits the copied data via the communication lines 40 of which tx<tr.

As described above, in the redundant communication system according to the second embodiment, redundant transmission is performed by the transmission waiting data being copied and transmitted via a plurality of communication lines of which communication speeds differ. In this case, the transmission apparatus sets the predicted transmission-completion time when redundant transmission is not performed as the predicted transmission-completion time when the transmission waiting data is transmitted via the communication line that has the fastest communication speed.

In addition, the transmission apparatus sets the predicted transmission-completion time when redundant transmission is performed as the predicted transmission-completion time when the transmission waiting data is transmitted via each of the other communication lines. Then, the transmission apparatus determines the number of communication lines of which the delay in the predicted transmission-completion time when redundant transmission is performed, in relation to the predicted transmission-completion time when redundant transmission is not performed is equal to or less than the predetermined value as the upper limit of the redundancy level. As a result, even when a method of redundant transmission differs from that according to the first embodiment, effects similar to those according to the first embodiment can be achieved.

Here, according to the second embodiment, the communication speed of each communication line may be a prescribed communication speed of the communication line or may be an estimated available bandwidth (estimated speed). In the latter case, the predicted transmission-completion time that takes into consideration convergence of the communication line can be predicted.

Here, according to the above-described embodiments, a case in which the redundant communication apparatus of the present disclosure operates on the transmission apparatus is described. However, this is not limited thereto. For example, the determining unit may be provided on the reception apparatus side. In this case, the upper limit of the redundancy level determined by the reception apparatus may be transmitted to the transmission apparatus.

In addition, the processes that are performed by the CPU reading software (program) according to the above-described embodiments may be performed by various processors other than the CPU. As examples of the processor in this case, a programmable logic device (PLD) in which a circuit configuration can be modified after manufacturing, such as a field-programmable gate array (FPGA), a dedicated electronic circuit that is a processor that has a circuit configuration that is specifically designed to perform a specific process, such as an application-specific integrated circuit (ASIC), and the like can be given. Furthermore, the processes may be performed by one of the various processors or by a combination of two or more processors of a same type or differing types (such as a plurality of FPGAs or a combination of the CPU and an FPGA). Moreover, a hardware structure of these various processors is, more specifically, an electronic circuit in which circuit elements, such as a semiconductor element, are combined.

In addition, according to the above-described embodiments, an aspect in which the redundant communication program is stored (installed) in a storage unit in advance is described. However, this is not limited thereto. The program may be provide so as to be stored in a non-transitory computer-readable (tangible) storage medium such as a CD-ROM, a DVD-ROM, or a USB memory. Furthermore, the program may be downloaded from an external apparatus via a network.

What is claimed is:

1. A redundant communication apparatus comprising:
   a determining unit that determines an upper limit of a redundancy level when transmission waiting data in a transmission apparatus is made redundant and transmitted, based on a data quantity of the transmission waiting data and a communication speed of a communication line between a reception apparatus that is a transmission destination of the transmission waiting data and the transmission apparatus; and
   a transmitting unit that causes the transmission waiting data to be made redundant at a redundancy level that is equal to or less than the upper limit determined by the determining unit and transmits the data to the reception apparatus via the communication line, wherein
   the determining unit determines the upper limit of the redundancy level such that a delay in a predicted time of completion of transmission to the reception apparatus when the transmission waiting data is made redundant and transmitted, in relation to a predicted time of completion of transmission to the reception apparatus when the transmission waiting data is transmitted without being made redundant, is equal to or less than a predetermined value.

2. The redundant communication apparatus according to claim 1, wherein:
   the determining unit sets the predetermined value to be a fixed value that is based on an application related to the transmission waiting data or a predicted value of a delay that occurs as a result of data that is lost during transmission being retransmitted.

3. The redundant communication apparatus according to claim 2, wherein:
   the determining unit predicts the predicted time of completion of transmission to the reception apparatus when the transmission waiting data is made redundant and transmitted, based on a data quantity when redundant data composed of an error correction code is added to the transmission waiting data and the communication speed of the communication line.

4. The redundant communication apparatus according to claim 3, wherein:
   the determining unit determines the upper limit of the redundancy level such that an upper limit of a data quantity of the redundant data is a data quantity that can be transmitted within an amount of time indicated by the predetermined value.

5. The redundant communication apparatus according to claim 2, wherein:
   when the transmission waiting data is made redundant and transmitted by the transmission waiting data being copied and transmitted via a plurality of communication lines of which communication speeds differ,
   the determining unit
      sets the predicted time of completion of transmission to the reception apparatus when the transmission waiting data is transmitted without being made redundant as a predicted time of completion of transmission when the transmission waiting data is transmitted via the communication line that has a fastest communication speed among the plurality of communication lines, and
      sets the predicted time of completion of transmission to the reception apparatus when the transmission waiting data is made redundant and transmitted as a predicted time of completion of transmission when the transmission waiting data is transmitted via each communication line other than the communication line that has the fastest communication speed among the plurality of communication lines.

6. The redundant communication apparatus according to claim 5, wherein:
   the determining unit determines a number of communication lines of which the delay is equal to or less than the predetermined value among the plurality of communication lines as the upper limit of the redundancy level.

7. The redundant communication apparatus according to claim 1, wherein:
   the determining unit predicts the predicted time of completion of transmission to the reception apparatus when the transmission waiting data is made redundant and transmitted, based on a data quantity when redundant data composed of an error correction code is added to the transmission waiting data and the communication speed of the communication line.

8. The redundant communication apparatus according to claim 7, wherein:
   the determining unit determines the upper limit of the redundancy level such that an upper limit of a data quantity of the redundant data is a data quantity that can be transmitted within an amount of time indicated by the predetermined value.

9. The redundant communication apparatus according to claim 1, wherein:

when the transmission waiting data is made redundant and transmitted by the transmission waiting data being copied and transmitted via a plurality of communication lines of which communication speeds differ, the determining unit sets the predicted time of completion of transmission to the reception apparatus when the transmission waiting data is transmitted without being made redundant as a predicted time of completion of transmission when the transmission waiting data is transmitted via the communication line that has a fastest communication speed among the plurality of communication lines, and sets the predicted time of completion of transmission to the reception apparatus when the transmission waiting data is made redundant and transmitted as a predicted time of completion of transmission when the transmission waiting data is transmitted via each communication line other than the communication line that has the fastest communication speed among the plurality of communication lines.

10. The redundant communication apparatus according to claim 9, wherein:

the determining unit determines a number of communication lines of which the delay is equal to or less than the predetermined value among the plurality of communication lines as the upper limit of the redundancy level.

11. A redundant communication method comprising:

determining, by a determining unit, an upper limit of a redundancy level when transmission waiting data in a transmission apparatus is made redundant and transmitted, based on a data quantity of the transmission waiting data and a communication speed of a communication line between a reception apparatus that is a transmission destination of the transmission waiting data and the transmission apparatus; and causing, by a transmitting unit, the transmission waiting data to be made redundant at a redundancy level that is equal to or less than the upper limit determined by the determining unit and transmitting the data to the reception apparatus via the communication line, wherein the determining unit determines the upper limit of the redundancy level such that a delay in a predicted time of completion of transmission to the reception apparatus when the transmission waiting data is made redundant and transmitted, in relation to a predicted time of completion of transmission to the reception apparatus when the transmission waiting data is transmitted without being made redundant, is equal to or less than a predetermined value, wherein determining an upper limit of a redundancy level comprises determining the upper limit of the redundancy level such that a delay in a predicted time of completion of transmission to the reception apparatus when the transmission waiting data is made redundant and transmitted, in relation to a predicted time of completion of transmission to the reception apparatus when the transmission waiting data is transmitted without being made redundant, is equal to or less than a predetermined value.

12. A non-transitory computer-readable storage medium storing therein a redundant communication program for causing a computer to implement:

determining an upper limit of a redundancy level when transmission waiting data in a transmission apparatus is made redundant and transmitted, based on a data quantity of the transmission waiting data and a communication speed of a communication line between a reception apparatus that is a transmission destination of the transmission waiting data and the transmission apparatus; and causing the transmission waiting data to be made redundant at a redundancy level that is equal to or less than the upper limit, and transmitting the data to the reception apparatus via the communication line, wherein:

determining an upper limit of a redundancy level comprises determining the upper limit of the redundancy level such that a delay in a predicted time of completion of transmission to the reception apparatus when the transmission waiting data is made redundant and transmitted, in relation to a predicted time of completion of transmission to the reception apparatus when the transmission waiting data is transmitted without being made redundant, is equal to or less than a predetermined value.

* * * * *